US010350525B2

(12) United States Patent
Ritzka et al.

(10) Patent No.: US 10,350,525 B2
(45) Date of Patent: Jul. 16, 2019

(54) CONNECTING STRUCTURE FOR CONNECTING A FILTER HOUSING TO A FILTER HOUSING RETAINING STRUCTURE, CLEANING SYSTEM, FILTER HOUSING COVER FOR A FILTER HOUSING AND METHOD FOR CONNECTING A FILTER HOUSING COVER TO A FILTER HOUSING RETAINING STRUCTURE

(71) Applicant: SARTORIUS LAB INSTRUMENTS GMBH & CO. KG, Goettingen (DE)

(72) Inventors: Roman Ritzka, Obernfield (DE);
Sebastian Purmann, Goettingen (DE);
Richard Brisland, Gloucestershire (GB)

(73) Assignee: SARTORIUS LAB INSTRUMENTS GMBH & CO. KG (DE)

( * ) Notice: Subject to any disclaimer, the term of this patent is extended or adjusted under 35 U.S.C. 154(b) by 0 days.

(21) Appl. No.: 15/523,756

(22) PCT Filed: Nov. 25, 2015

(86) PCT No.: PCT/EP2015/002369
§ 371 (c)(1),
(2) Date: May 2, 2017

(87) PCT Pub. No.: WO2016/082931
PCT Pub. Date: Jun. 2, 2016

(65) Prior Publication Data
US 2017/0312665 A1 Nov. 2, 2017

(30) Foreign Application Priority Data

Nov. 26, 2014 (DE) .................. 10 2014 017 537

(51) Int. Cl.
B01D 35/30 (2006.01)
B01D 15/08 (2006.01)
C02F 1/28 (2006.01)

(52) U.S. Cl.
CPC ............. *B01D 35/30* (2013.01); *B01D 15/08* (2013.01); *C02F 1/283* (2013.01);
(Continued)

(58) Field of Classification Search
CPC .................. B01D 35/30; B01D 15/08; B01D 2201/4007; B01D 2201/4023; B01D 2201/305; B01D 2201/303; C02F 1/283
(Continued)

(56) References Cited

U.S. PATENT DOCUMENTS 6,896,713 B1  5/2005 Eckerbom et al.
7,163,237 B2  1/2007 Niermeyer
7,578,936 B2  8/2009 Gaignet et al.

FOREIGN PATENT DOCUMENTS

DE  60208437 T2  8/2006
EP  0 870 921     10/1998
(Continued)

OTHER PUBLICATIONS

International Search Report dated Mar. 4, 2016.
Translation of International Preliminary Report on Patentability for Application No. PCT/EP2015/002369 dated May 30, 2017.

*Primary Examiner* — Madeline Gonzalez
(74) *Attorney, Agent, or Firm* — Gerald E. Hespos; Michael J. Porco; Matthew T. Hespos

(57) ABSTRACT

A connecting structure connects a filter housing to a filter housing retaining structure. The connecting structure conducts a liquid that is to be cleaned to the filter housing and discharges a purified liquid. The connecting structure includes a filter housing cover that connects to the filter housing and that receives a filter medium. The filter housing (Continued)

cover has attachment elements that connect to corresponding attachment elements of the filter housing retaining structure to establish an exchange of fluids between the filter housing retaining structure and the filter housing. Filter housing cover guides are on opposing sides of the filter housing cover; and guides on the filter housing retaining structure engage the filter housing cover guides when connecting the attachment elements of the filter housing cover with the attachment elements of the filter housing retaining structure to support and linearly guide the filter housing cover during the connection process.

14 Claims, 12 Drawing Sheets

(52) U.S. Cl.
CPC .. *B01D 2201/303* (2013.01); *B01D 2201/305* (2013.01); *B01D 2201/4007* (2013.01); *B01D 2201/4023* (2013.01)

(58) Field of Classification Search
USPC .................. 210/435, 232, 441, 443–445
See application file for complete search history.

(56) References Cited

FOREIGN PATENT DOCUMENTS

| | | | |
|---|---|---|---|
| EP | 0870921 A2 * | 10/1998 | ............. B01D 35/30 |
| EP | 1 542 782 | 6/2012 | |
| WO | 2014/210365 | 12/2014 | |

* cited by examiner

CONNECTING STRUCTURE FOR CONNECTING A FILTER HOUSING TO A FILTER HOUSING RETAINING STRUCTURE, CLEANING SYSTEM, FILTER HOUSING COVER FOR A FILTER HOUSING AND METHOD FOR CONNECTING A FILTER HOUSING COVER TO A FILTER HOUSING RETAINING STRUCTURE

BACKGROUND

1. Field of the Invention

The present application relates to a connecting structure for connecting a filter housing to a filter housing retaining structure, to a cleaning system having this type of connecting structure and filter housing retaining structure, to a filter housing cover for a filter housing and to a method for connecting a filter housing cover to a filter housing retaining structure.

2. Description of the Related Art

Pure water is usually required to supply laboratory devices (e.g. autoclaves, rinsing machines, water baths, etc.). This water should be as free as possible of ions, organic components, particles and other possible impurities so as not to influence the functionality of the laboratory devices or subsequently cause contaminations.

Water is likewise required for the preparation of buffers and cell culture media. The prepared water must have a high degree of purity so that it does not negatively influence the growth of the cell cultures.

Water treatment systems that remove the various impurities from the water are used to prepare pure water or ultrapure water for the applications described above.

In this system, water is conducted through a filter housing containing a filter medium, such as activated carbon and/or resin, which filters the undesirable impurities out of the water.

For this purpose, the filter housing is coupled with a housing of the water treatment system so that it can be supplied via the housing of the water treatment device which contains the water to be cleaned or which is connected to a corresponding water supply line. The purified water then flows back into the collection tank for the purified water within the water treatment device.

However, coupling the filter housing with the housing of the water treatment device has proved to be problematic in the prior art.

For example, a support structure for a filter housing is known from European patent EP 1 542 782 B1. The support structure has two support arms which face each other. Each of the opposing sides of the support arms is provided with a recess that extends in a direction for connecting the filter housing to the support structure. The recesses taper toward the support structure. A latching lug is located on the lower surface of the recess and protrudes into said recess. The filter housing has a cover, the lateral surfaces of which can each be inserted into the recesses. To accomplish this, the lateral surfaces of the cover are first moved in a tilted position along the upper surface of the recesses toward the support structure. As soon as the user senses resistance, which is intended to correspond to the connected position, the user must tilt the cover and the filter housing downward so that a recess in each lateral surface of the cover latches with the latching lug in the recess of the support arms.

However, this design from the prior art has the disadvantage that the lateral surfaces of the cover must initially be fitted precisely into the region between the latching lug and the inclined upper surface of the two recesses in the support arms. This requires that the cover and the filter housing be held in the precisely tilted position, since the latching lug would otherwise block a displacement to the connected position in the recesses.

Consequently, the problem addressed by the present invention is that of providing a connecting structure for connecting a filter housing with a filter housing retaining structure, which permits a simple and reliable connection.

SUMMARY

This problem is solved according to one aspect of the present application by a connecting structure for connecting a filter housing to a filter housing retaining structure, said structure being designed to conduct a liquid that is to be cleaned to the filter housing and to discharge the purified liquid, wherein the structure comprises:

a filter housing cover that can be connected to the filter housing, which is designed to receive a filter medium, comprising:
  at least two filter housing cover attachment elements that can be connected to corresponding filter housing retaining structure attachment elements in the filter housing retaining structure in order to establish an exchange of fluids between the filter housing retaining structure and the filter housing;
  at least two filter housing cover guide members, which are provided on substantially opposing sides of the filter housing cover; and
guide members, which are arranged on the filter housing retaining structure and are configured such that the filter housing cover guide members engage with the guide members during the process of connecting the attachment elements of the filter housing cover with the attachment elements of the filter housing retaining structure in order to support and guide the filter housing cover during the connection process and to mount it such that it can be displaced in a linear connecting direction.

The term "linear" in this instance also includes a connecting direction that is substantially linear. "Substantially" is understood to include a minor deviation owing to expansion, for example.

The term "connectable" refers both to reversible connections between the attachment elements of the filter housing retaining structure and the attachment elements of the filter housing cover and to non-reversible connections between the filter housing cover and the filter housing. The connection between the filter housing cover and the filter housing can also be configured as a non-reversible connection, though.

The guide members permit the filter housing cover, on which the filter housing cover attachment elements are located, to be displaced toward the attachment elements of the filter housing retaining structure in a straight-line movement. The filter housing cover is supported throughout the connection process and is retained in a predetermined position so that the attachment elements of the filter housing cover can be reliably connected to the attachment elements of the filter housing retaining structure. In other words, the attachment elements of the filter housing cover are guided specifically to the attachment elements of the filter housing retaining structure. In particular, it is possible to completely avoid tilting, and so the user can connect the filter housing cover to the filter housing retaining structure by hand.

The at least two filter housing cover guide members preferably protrude from the two opposite sides of the filter housing cover in a direction substantially perpendicular to an attaching direction of the filter housing cover attachment elements.

The filter housing cover guide members can thus be reliably positioned in the guide elements and guided to the filter housing retaining structure. A lateral tilting or canting is prevented in this way. Accordingly, the attachment elements of the filter housing cover which are formed on the filter housing cover can be displaced precisely to the attachment elements of the filter housing retaining structure, and a reliable connection can be thereby established.

It is further preferred that at least one latching member be arranged on the filter housing retaining structure and/or on the filter housing cover and/or on the filter housing to latch the filter housing cover in a connected position, in which the attachment elements of the filter housing cover are fully connected to the attachment elements of the filter housing retaining structure.

The latching member offers the advantage that the user notices increased resistance shortly before the connected position, which indicates to the user that the filter housing cover has almost reached the connected position. As a result of deliberately overcoming the increased resistance, the corresponding element interlocks with the latching member, and the filter housing cover is thus retained in the connected position. The unintentional removal of the filter housing cover can thereby be prevented, and so the connection between the attachment elements of the filter housing cover and the attachment elements of the filter housing retaining structure can be reliably maintained.

The latching member also preferably has a resilient latching clamp, and preferably a pin engages in said clamp when in the connected position and protrudes from the filter housing cover perpendicular to the connecting direction.

Alternatively or additionally, the latching member has a snap fastener.

Preferably, the attaching direction substantially corresponds to the connecting direction.

As soon as the filter housing cover is engaged with the guide members, the attachment elements of the filter housing cover, which are oriented in an attaching direction, are oriented in the connecting direction. If the filter housing cover moves in the connecting direction toward the attachment elements of the filter housing retaining structure, which are preferably likewise oriented in the attaching direction, the attachment elements of the filter housing cover can be connected to the attachment elements of the filter housing retaining structure in a straight line, and so a reliable connection can be established. Any tilting to establish a connection is avoided.

Further preferred is that the guide members have guide rails, which lie opposite each other and are configured linearly to correspond to the connecting direction.

Alternatively or additionally, the latching member can have filter housing cover latching lugs and guide member latch recesses, wherein each of the guide members has at least one guide element latch recess, and a filter housing cover latching lug that is arranged on the filter housing cover can be latched into each recess in a connected position, in which the attachment elements of the filter housing cover are fully connected to the attachment elements of the filter housing retaining structure.

Preferably, the filter housing cover guide members are mounted resiliently and/or comprise actuation surfaces extending in an attaching direction of the filter housing cover attachment elements and protruding from the filter housing cover in a direction opposite the filter housing cover attachment elements.

This makes it possible for the engagement between the filter housing retaining structure and the filter housing cover to be released by pressing the actuation surfaces together. In addition, the engagement can be reinforced when the user pushes the actuation surfaces apart in the connected position in order to ensure that the filter housing cover latching lugs are reliably interlocked with the guide member latch recesses.

It is further preferred that the actuation surfaces be configured such that they widen or taper in the attaching direction and/or connecting direction.

Because the actuation surfaces have a widening or tapering shape, the user can grip the actuation surfaces securely. The tapering shape of the actuation surfaces in particular can further ensure that people with smaller hands are also able to operate the actuation surfaces by hand.

Moreover, it is preferred that the filter housing cover latching lugs project from the filter housing guide members in a direction perpendicular to the attaching direction.

Among other things, this permits the latching lugs of the filter housing cover to be clearly visible externally once the filter housing cover latching lugs have entered into the latch recesses of the guide member. The guide member latch recess are preferably configured as through-holes in the guide members for this purpose.

Preferably, at least one pressure transducer is disposed on a rear end of the filter housing cover which is designed to be pushed by the user in order to connect the filter housing cover with the filter housing retaining structure.

The rear end of the filter housing cover is understood in this instance to be the end that is opposite the end on which the filter housing cover attachment elements are arranged. When a user pressed on the pressure transducer, especially at the end of the connection process, the user can more easily apply the necessary force to completely connect the attachment elements of the filter housing cover to the attachment elements of the filter housing retaining structure.

According to a further aspect of the present application, the problem of interest is solved by a cleaning system, which has a connecting structure corresponding to one of the aforementioned embodiments of the aforementioned aspect as well as a filter housing retaining structure, to which the filter housing cover can be connected.

The filter housing retaining structure preferably has filter housing retaining structure attachment elements, which are oriented in the connecting direction and with which the filter housing cover attachment elements of the filter housing cover can be connected.

Also preferably, the filter housing retaining structure attachment elements or the filter housing cover attachment elements each have at least one latching hook that, in the connected position, latches into a depression in the corresponding attachment element, with which it can be connected.

Furthermore, it is preferred that the filter housing cover be connected to the filter housing cover and that the resilient latching clamp be designed to accommodate the filter housing when in the connected state.

Preferably, the guide members are connected by a retaining plate arranged on a housing of the filter housing retaining structure, wherein each of the filter housing retaining structure attachment elements is inserted into a recess in the retaining plate and protrudes through it so as to be connectable with the filter housing cover attachment elements.

Preferably, the filter housing retaining structure attachment element is mounted in the recess such that displacement in the connecting direction V is blocked.

According to a further aspect of the present application, the problem of interest is solved by a filter housing cover for a filter housing, which can be connected to a filter housing retaining structure that is designed to supply a fluid that is to be cleaned and to discharge the purified fluid,
wherein the filter housing cover is designed to be connected to the filter housing,
wherein the filter housing cover has at least two filter housing cover attachment elements, which can be connected to corresponding filter housing retaining structure attachment elements in order to establish an exchange of fluid between the filter housing retaining structure and the filter housing; and
wherein the filter housing cover has at least two filter housing cover guide members, which are provided on opposite sides of the filter housing cover and are designed to engage in guide members that can be attached to the filter housing retaining structure during the process of connecting the attachment elements of the filter housing cover with the attachment elements of the filter housing retaining structure in order to support and guide the filter housing cover during the connection process and to mount it such that it can be displaced in a linear connecting direction.

According to a further aspect of the present application, the problem of interest is solved by a method for connecting a filter housing cover to a filter housing retaining structure, wherein the method comprises:
  providing a cleaning system corresponding to one of the embodiments of the aforementioned further aspect of the present application;
  inserting the filter housing cover guide members into the guide members such that the filter housing cover guide members are supported in the guide members;
  displacing the filter housing cover linearly in the connecting direction until the attachment elements of the filter housing cover are connected to the attachment elements of the filter housing retaining structure.

The method preferably further includes the step of latching the filter housing cover or the filter housing to the filter housing retaining structure by means of at least one latching member.

These and other objectives, features and advantages of the present invention will become more apparent upon reading the following detailed description of preferred embodiments and the accompanying drawings. It is clear that, although embodiments are described separately, individual features thereof may be combined into additional embodiments.

DETAILED DESCRIPTION

Figure 1:
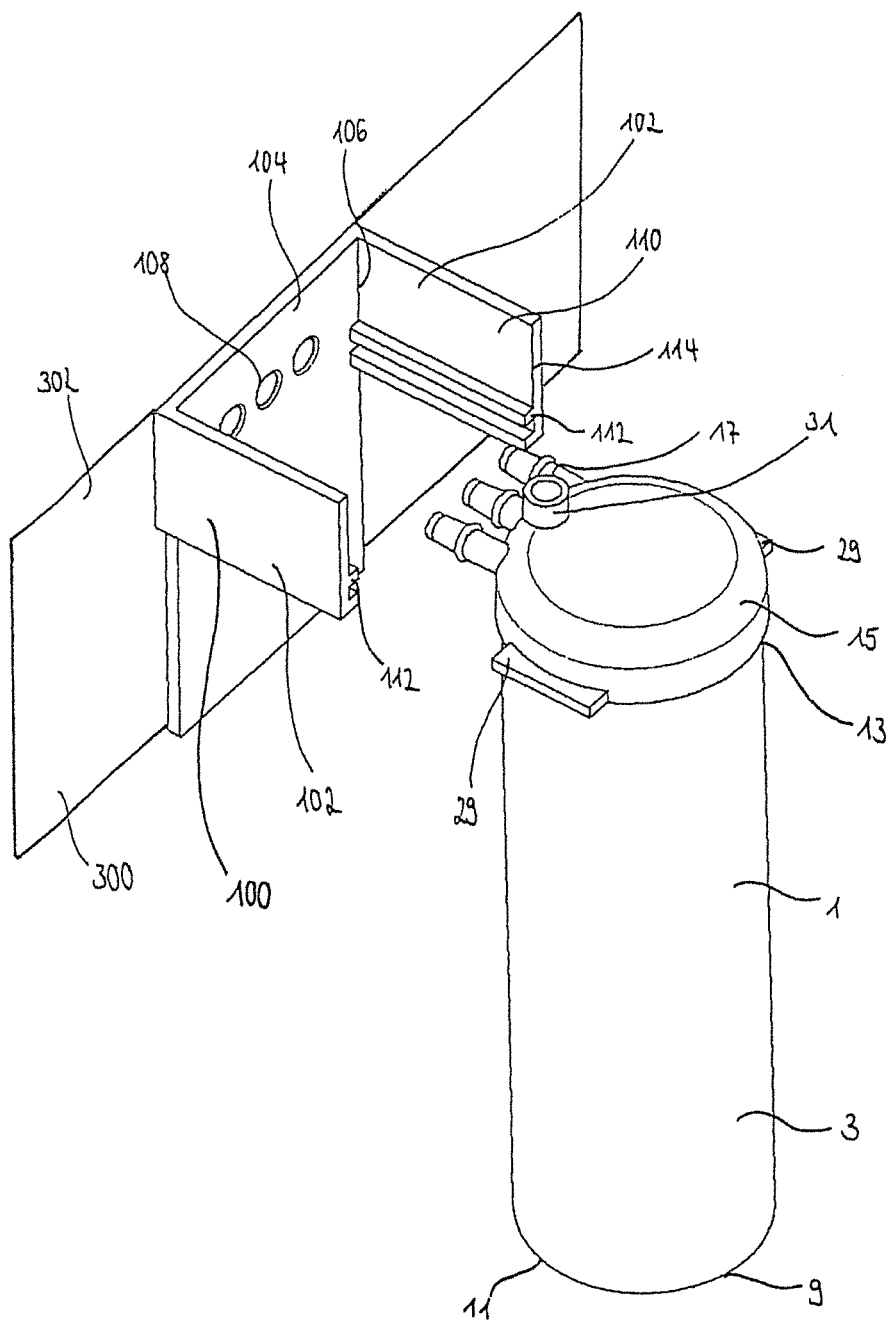
FIG. 1 shows a guide frame by means of which a filter housing can be connected to a filter housing retaining structure.

FIG. 1 shows a filter housing 1 having a tubular base body 3. A base body interior of the base body 3 is configured to receive a filter medium or multiple different filter media (not shown), such as activated carbon and/or resin, to clean a fluid, e.g. water. For this purpose, the filter media can be loaded directly into the base body interior or introduced into the base body by means of filter cartridges containing the filter medium.

To close the base body interior inwardly, the filter housing 1 further includes a filter housing base 11 on or near a first free end 9 and a filter housing cover 15 on or near a second free end 13. The filter housing base 11 and/or the filter housing cover 15, together with the base body 3, can be formed from one piece or can be non-detachably interconnected from multiple parts. However, in order to allow the filter cartridge or filter medium to be changed, it is preferred that the filter housing base 11 and/or the filter housing cover 15 be configured separately from the base body 3 and thus detachably connected to each other. For example, the filter housing base 11 and the filter housing cover 15 can be screwed on to the base body 3 or interlocked with it.

The filter housing cover 15 has at least two connector plugs 17 as preferred attachment elements for the filter housing cover, each of which can be connected to a corresponding connector socket (not shown in FIG. 1) as the preferred attachment elements of a filter housing retaining structure 300 in order to establish a fluid connection between the filter housing retaining structure 300 and the filter housing 1. In other words, a fluid to be cleaned can be conducted from the filter housing retaining structure 300 to the filter medium in the filter housing 1, preferably by means of a pump (not shown), via a connection between the connector plugs 17 and the connector sockets. Moreover, the purified fluid (e.g. pure water or ultrapure water) can be returned to the filter housing retaining structure 300 in a collection tank for the purified fluid. For instance, a fluid connection between a first connector plug 17 and a first connector socket is used to conduct a fluid that is to be cleaned to the filter medium in the filter housing 1, while a fluid connection between a second connector plug 17 and a second connector socket is used to return the purified fluid back to collection tanks provided for this purpose.

Although the present application describes the provision of connector plugs 17 only in reference to the filter housing cover 15, the filter housing base 11 can also have connector plugs. In particular, the filter housing cover 15 and the filter housing base 11 can be configured identically.

Furthermore, although FIG. 1 shows a filter housing cover 15 with connector plugs 17, connector sockets can alternatively be configured on the filter housing cover 15, while the connector plugs 17 are arranged on the filter housing retaining structure 300.

Additionally, the connector plugs 17 are oriented parallel to each other and on the same side of the filter housing cover 15. As is shown in FIG. 1, the connector plugs 17 project from the filter housing cover 15. The connector plugs 17 can be configured integrally with the filter housing cover 15 or can be at least partly formed as separate components. In the latter case, the connector plugs 17 can be connected to the filter housing cover 15 preferably by means of a latched, screwed or adhered connection.

Figure 2:
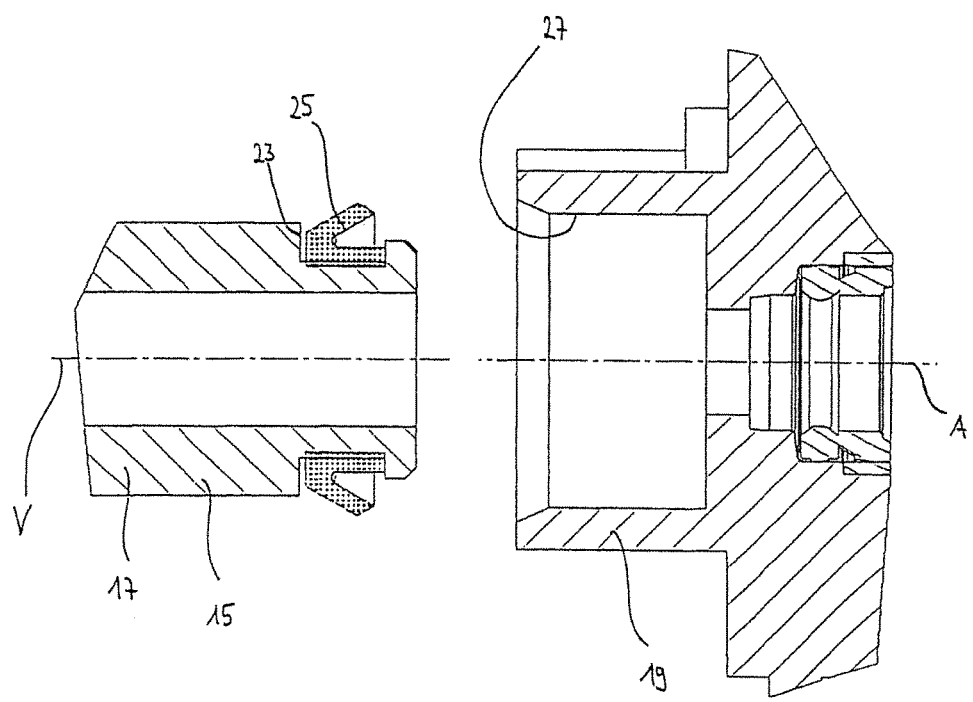
FIG. 2 shows a cross-sectional view of a connector plug and a connector socket.

FIG. 2 shows a cross-sectional view of a connector plug 17 and a connector socket 19.

The orientation of the connector plug 17 and the connector socket 19 is designated attaching direction A. In order for the connector plug 17 to be connected to the connector socket 19, the attaching direction A of the connector plug 17 and of the connector socket 19 must be identical. In particular, the attaching direction A corresponds to the rotary axis of the connector plug 17 and connector socket 19.

In order to be able to establish a fluid-tight connection between the connector plug 17 and the connector socket 19, the connector plug 17 has on an outer side 21 at least one circumferential notch 23, into (each of) which a sealing element 25 is inserted. When the connector plug 17 is in a connection state with the connector socket 19, the sealing element 25 comes into contact with an inner side 27 of the connector plug 19, and so a fluid-tight connection is established between the attachment elements.

Alternatively, at least one notch can be formed in the inner lateral surface of the connector socket 19 in which the sealing element 25 is arranged.

The sealing element 25 can be a circular sealing ring, a quad ring, a C ring, an O ring, a D ring or an L ring, or it can be sprayed on in a two-component plastic system. Preferably, the sealing element 25 is provided with a coating, such as Teflon, and/or a lubricant, which permits improved latching of the filter housing 1 with the filter housing retaining structure 300. A Teflon-coated quad ring is considered especially preferable.

In order to connect the filter housing 1 containing the filter medium to the filter housing retaining structure 300 and to retain and support it there, the filter housing retaining structure 300 has guide members. These guide members can preferably be configured in a guide frame 100 that is arranged on the filter housing retaining structure 300, as shown in FIG. 1. In particular, the guide members are designed to support the filter housing 1 during the connection process and to guide it to a connected position, in which the filter housing 1 is connected to the filter housing retaining structure 300.

The guide members and/or the guide frame 100 can be configured with a housing 302 of the filter housing retaining structure 300 as a structural unit or can be attached to the filter housing retaining structure 300. In the latter case, the guide members or guide frame 100 can preferably be connected to the filter housing retaining structure 300 with an adhesive bond or screwed to it.

FIG. 1 shows a separately configured guide frame 100, which is arranged on the filter housing retaining structure 300.

The guide frame 100 has at least two guide frame sides 102, which are oriented substantially parallel to each other and project from the filter housing retaining structure 300. Preferably, the guide frame sides 102 project from a vertical lateral surface of the housing 302 of the filter housing retaining structure 300 at a preferably right angle to the corresponding vertical lateral surface, which corresponds to a connecting direction V.

The distance between the at least two guide frame sides 102 is configured such that the filter housing 1 can be arranged at least partly between the guide frame sides 102.

The at least two guide frame sides 102 can be connected directly to the filter housing retaining structure 300. Alternatively, the at least two guide frame sides 102 can be connected by means of a guide frame retaining plate 104. Said guide frame retaining plate 104 preferably connects the first free ends 106 of each of the two guide frame sides 102. The first free end 106 is here considered to be the end of the guide frame sides 102 adjacent to the filter housing retaining structure 300.

The guide frame retaining plate 104 connects the guide frame sides 102 while at the same time preferably serving to attach the guide frame 100 to the filter housing retaining structure 300.

At least one attachment element recess 108 is formed in the guide frame retaining plate 104, through which the connector sockets (not shown in FIG. 1) protrude at least in part. If the guide frame retaining plate 104 has more than one attachment element recess 108, then a connector socket 19 preferably projects through each one.

A guide member is formed on or in each lateral surface 110 of the guide frame sides 102, which face each other. As is shown in FIG. 1, these guide members are preferably formed as guide rails 112. The guide rails 112 preferably extend over the entire length of the guide frame sides 102 from a second free end 114 to the corresponding first free end 106. The second free end 114 of a guide frame side 102 is arranged opposite the first free end 106.

The guide rail 112 is open at the second free end 114 so that a filter housing cover guide member 29 on the filter housing cover 15, which will be described hereafter, can be inserted into the guide rail 112 via the open end.

The end of the guide rail 112 at the first free end 106 of the guide frame side 102 is closed by a lateral surface of the filter housing retaining structure 300 or, as is shown in FIG. 1, by the guide frame retaining plate 104.

The guide rails 112 are substantially linear so as to permit a linear displacement of the filter housing cover 15 and thus of the filter housing 1.

In particular, the guide rails 112 are configured parallel to each other so that the filter housing cover 15 can be displaced into the guide rails 112 in a consistent straight line. Any tilting is thereby avoided.

Nevertheless, it is possible that the guide rails 112 are widened on or adjacent to the first free end 106 of the guide frame side 102.

The orientation of the guide rails 112 corresponds to the connecting direction V in which the filter housing cover 15 can be displaced toward the filter housing retaining structure 300.

It should be noted here that any descriptions of the guide members or the guide rails 12 without the guide frame 100 are also valid. The configuration of the guide members and the guide rails 12 in a guide frame 100 is understood to be only a preferred embodiment.

One filter housing cover guide member 29 is provided on each of substantially opposing sides of the filter housing cover 15, and said members preferably project from the filter housing cover 15. The shape of the filter housing cover guide member 29 is designed such that it can engage with a guide rail 112 and can be displaceably supported within it. Preferably, the filter housing cover guide members 29 project from the filter housing cover 15 in a direction perpendicular to the attaching direction A. The filter housing cover guide members 29 can thus be configured as a structural unit with the filter housing cover 15 or can be reversibly connected to it.

In other words, the guide frame 100 and guide rails 112 are configured such that it is possible to arrange a filter housing cover 15 at least partly between two guide frame sides 102 or guide rails 112, wherein each of the filter housing cover guide members 29 on opposing sides engages in a corresponding guide rail 112. The filter housing cover guide members 29 can be inserted into the guide rails 112 via the second free end 114 of the guide frame sides 102 and can be displaced in a linear direction within the guide rail 112 to the connected position. Accordingly, the filter housing cover 15 is supported on two sides during the connection process, and so the tilting or canting of the filter housing cover 15 can be avoided. Since the guide rails 112 have a linear shape, the filter housing cover 15 can be displaced to the connected position in a simple linear shape. Furthermore, the weight of the filter housing 1 can be borne by the guide rails 112.

Preferably, the attaching direction A of the connector plugs 17 corresponds to the connecting direction V as soon as the filter housing cover guide members 29 engage with the guide rails 112, and so the connector plugs 17 can be guided in a substantially linear direction of movement toward the connector sockets 19.

In order to hold the filter housing cover 15 and filter housing 1 in the connected position and to prevent an unintentional separation, the filter housing cover 15 can have a pin 31 that latches with a latching member in the connected position. As is shown in FIG. 1, the pin 31 preferably projects from the filter housing cover 15 perpendicularly to the attaching direction A and/or the connecting direction V.

The latching member can be arranged on the filter housing retaining structure 300 and/or the guide frame 100.

Figure 3:
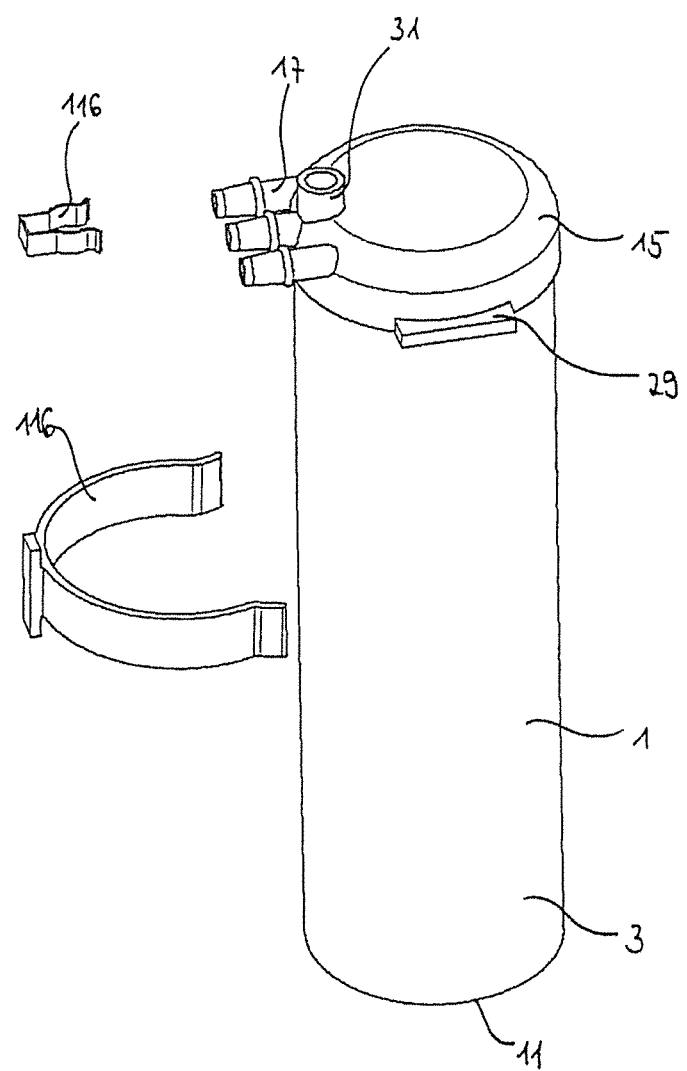
FIG. 3 shows a latching clamp as means for latching a filter housing in a connected position.

As is shown in FIG. 3, the latching member can be configured as a resilient latching clamp 116. Said latching clamp 116 is open to one side in the connecting direction V and/or in the attaching direction A so that the pin 31 can be received by the latching clamp 116 (see latching clamp at the top of FIG. 3) in the connected position. Alternatively, the latching clamp 116 (see the latching clamp lower in FIG. 3) can be configured in such a way that it can receive the base body 3 of the filter housing 1 in the connected position.

If the filter housing cover guide members 29 in the guide rails 112 are displaced toward the filter housing retaining structure 300 in the connecting direction V, the pin 31 and/or the base body 3 enter into the corresponding latching clamp 116 at the end of the connection process. For this to occur, the user must exert force sufficient to bend the latching clamp open resiliently so that the pin 31 or the base body 3 can be pushed into the latching clamp 116. Once the pin 31 or base body 3 is arranged in the latching clamp 116, the latching clamp 116 preferably moves back to its starting position, and so the pin 31 or base body 3 is retained in the latching clamp 116. An unintended separation of the filter housing 1 from the filter housing retaining structure 300 can thereby be prevented. Moreover, the user feels the resistance of the latching clamp 116 during the connection process and thus reliably determines when the connected position has been reached, namely as soon as the resistance has been overcome. In other words, an inertial connection is established.

Figure 4:
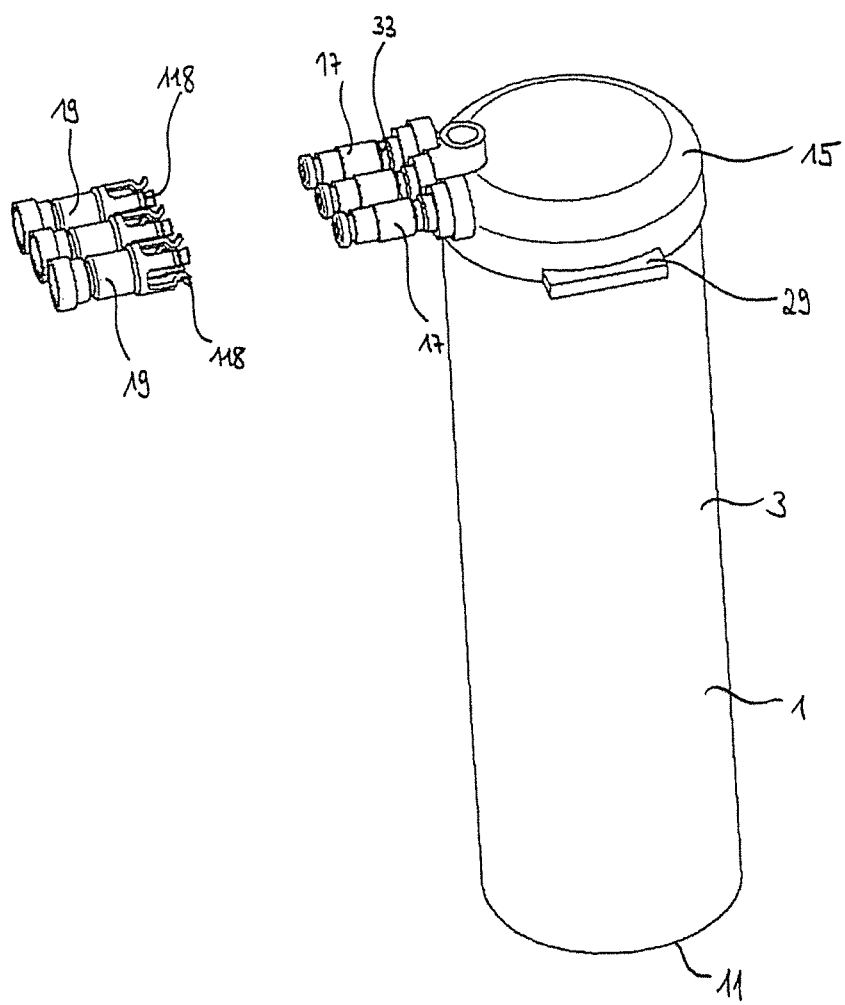
FIG. 4 shows latching hooks as means for latching a filter housing in the connected position.

The latching clamps 116 described above can be used as alternatives or in combination Alternatively or additionally, the latching member can be configured as at least one latching hook 118, as is shown in FIG. 4. The at least one latching hook 118 projects from a free end of the connector socket 19 in the connecting direction V and/or the attaching direction A in order to engage in a depression 33 in the connector plug 17 and interlock with it in the connected state.

One, two, three, four, five, six or more latching hooks 118 can be provided on a connector socket 19. The depression 33 in the connector plug 17, into which the latching hooks 118 of a connector socket 19 latch, can be configured as a circumferential depression 33 or can consist of multiple individual depressions 33 into each of which at least one latching hook 118 can latch.

Although the latching hooks 118 according to FIG. 4 are arranged on the connector sockets 19, the latching hooks can alternatively be provided on the connector plugs 17. In this case, the connector sockets 19 have the depression 33 required for engagement.

Alternatively or additionally, a snap fastener 200 can aid in latching the filter housing cover 15 in the connected position.

Figure 5:
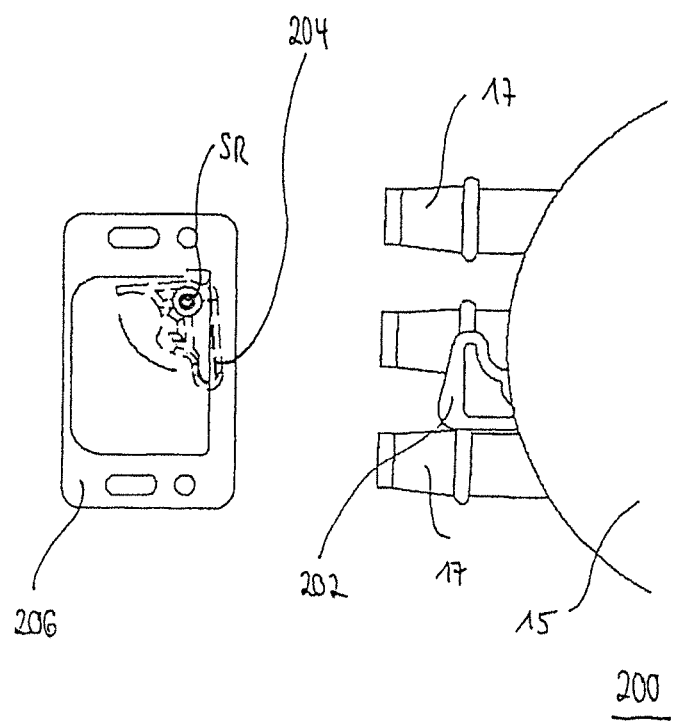
FIG. 5 shows a snap fastener as means for latching a filter housing in the connected position.

FIG. 5 shows a preferred embodiment of a snap fastener 200.

The snap fastener 200 shown in FIG. 5 has a clasp 202 and a preferably spring-loaded catch 204, which are interlocked in the connected state.

As is shown in FIG. 5, the clasp 202 can be arranged on the filter housing cover 15 and can protrude from the filter housing cover 15 in the attaching direction A and/or the connecting direction V.

On the other hand, the catch 204 cab be arranged on the filter housing retaining structure 300 or the guide frame 100, preferably on the guide frame retaining plate 104, by means of a catch retaining plate 206. The catch 204 is rotatably mounted around a catch rotary axis SR so that it can be rotated between an open and a closed position.

In the open position of the catch 204, the filter housing cover 15 can be displaced to the connected position and the filter housing cover 15 can be removed from the connected position. Once the filter housing cover 15 has reached the connected position, the catch 204 rotates about the catch rotary axis SR so as to engage with the clasp 202 and latch with it.

The connection can be released only when the user actively unlatches the snap fastener 200, and so a reliable connection between the attachment elements is ensured.

Although FIG. 5 shows that the clasp 202 is arranged on the filter housing cover 15 and the catch 204 is attached to the guide frame 100, it is likewise possible that the clasp is arranged on the guide frame 100 and the catch 204 is on the filter housing cover 15.

Furthermore, the corresponding catch component can also be arranged on the filter housing retaining structure 300 itself rather than on the guide frame 100.

A magnetic closure and a quick connector are other alternatives of an engagement which are not shown.

Figure 6A:
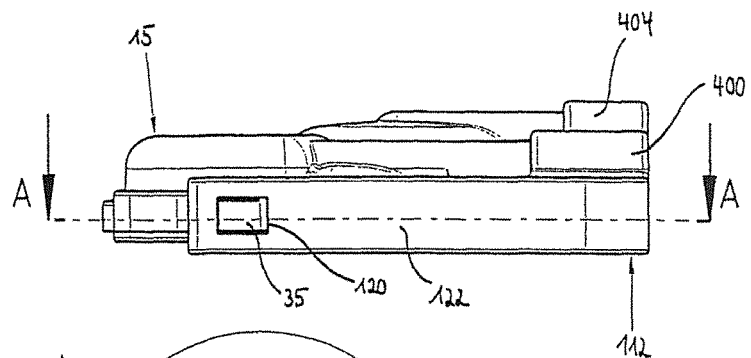
FIG. 6a)-c) show a filter housing cover with filter housing cover latching lugs which, in the connected state, engage in guide member latching recesses in the guide members, and widening actuation surfaces.
Figure 6B:
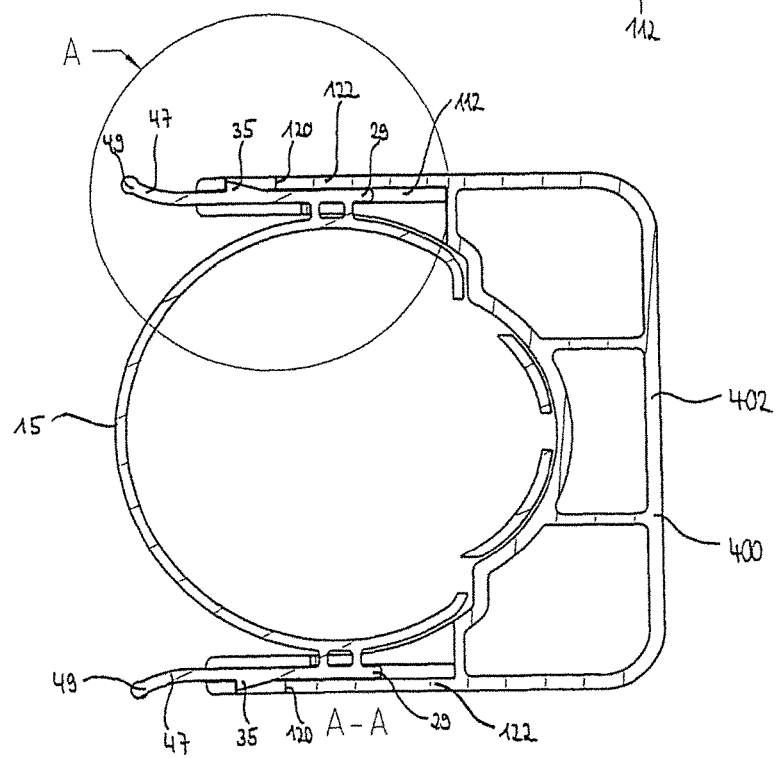
Figure 6C:
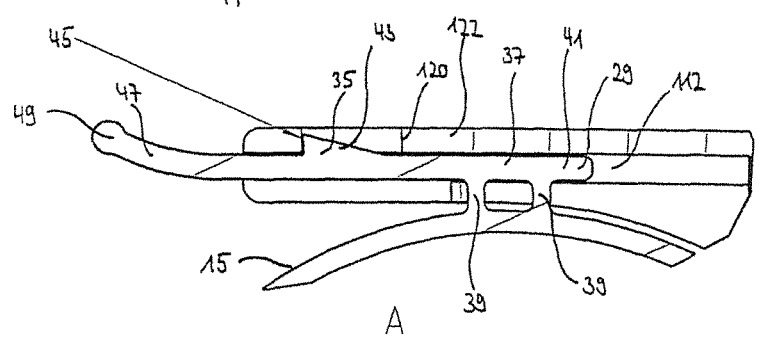

FIG. 6 shows a further alternative of a latching member that can be used to retain the filter housing 1 and the filter housing cover 15 in the connected position, in which the attachment elements are fully connected to each other by means of a latching connection.

In the present case, the latching member has filter housing cover latching lugs 35 on the filter housing cover 15 and has guide member latching recesses 120 in the guide members.

As is shown in FIG. 6b), which corresponds to a sectional view along section line A-A in FIG. 6a), the filter housing cover 15 has filter housing cover guide members 29, which are arranged on opposite sides of the filter housing cover 15 in a direction preferably perpendicular to the attaching direction A and/or connecting direction V. It is further preferred that the filter housing cover guide members 29 be located substantially on one plane.

The filter housing cover guide members 29 have elongate filter housing cover guide elements 37, which preferably extend in connecting direction V and/or attaching direction A. In particular, the filter housing cover guide elements 37 are congruent in shape with the guide members, at least in some areas, so that they can at least partly enter into and be guided within the guide members during the process of connecting the filter housing 1 to the filter housing retaining structure 300.

The filter housing cover guide elements 37 are each spaced from the filter housing cover 15 by at least one spacer member. The spacer member is configured to attach the filter housing cover guide elements 37 to the filter housing cover 15 and to mount the filter housing cover guide elements 37 resiliently. The spacer member can be configured as a spacing bracket 39. As is shown in FIG. 6b), two spacing brackets 39 can preferably be placed such that they arrange a filter housing cover guide element 37 on the filter housing cover 15. To permit a resilient movement of the filter housing cover guide element 37, the spacing brackets 39 are distanced from one another in attaching direction A and/or connecting direction V. Moreover, the length and thickness of the spacing brackets 39 are designed according to how far the filter housing cover guide elements 37 can be deflected and how smoothly this movement can be executed.

The spacing brackets 39 preferably project from the filter housing cover 15 in a direction perpendicular to the attaching direction A and/or the connecting direction V. The length of the spacing brackets 39 defines the distance between the filter housing cover guide elements 37 and the filter housing cover 15.

The spacing brackets 39 are connected to the filter housing cover guide elements 37 at or near the first end 41 of the filter housing cover guide elements 37. The first end 41 of the filter housing cover guide elements 39 is considered in this instance to be the end that is closer to the connector plugs 17 of the filter housing 1. "Close" to the first end 41 is considered to be a distance of approximately 5 mm to 30 mm, preferably approximately 10 mm to 25 mm, and preferably approximately 15 mm to 20 mm.

Preferably, a filter housing cover latching lug 35 is arranged on a side of the filter housing cover guide elements 37 that faces away from the filter housing cover 15. The filter housing cover latching lug 35 preferably has an inclined surface 43 that rises, preferably continuously, from a side closer to the connector plugs 17 in the attaching direction A. Alternatively, the inclined surface 43 can rise discontinuously or step-wise or trapezoidally. A second surface of the filter housing cover latching lug 35 extends perpendicularly to the filter housing cover guide element 37 and serves as a latching surface 45 for the latching lug.

The guide members or, as is shown in FIG. 6, the guide rails 112 each have at least one guide member latching recess 120. This recess can be configured as an opening that is penetrated by the guide rail 112 or as a depression, wherein the depression must be formed in a lateral surface of the guide rail 112 that faces the filter housing cover 15 when the filter housing cover 15 is deployed.

In the connected state when the attachment elements are fully connected, the filter housing cover latching lugs 35 can each be latched into the latch recesses 120 of the guide members.

The width of the filter housing cover 15, including the spacing brackets 39 and the filter housing cover guide elements 37, is preferably such that the filter housing cover guide elements 37 can be inserted into the guide rails 112 and displaced within them. However, the width of the filter housing cover 15, including the spacing brackets 39 and the filter housing cover guide elements 37 plus the filter housing cover latching lugs 35, is greater than the width between the outer surfaces 122 of the guide rails 112. The outer surface 122 is considered in this instance to be the surface of the guide rails 112 that faces the filter housing cover 15 when the inserted state.

The filter housing cover latching lugs 35 are preferably arranged in a position that is further away from the connector plugs 17 than the spacing brackets 39.

If the filter housing cover 15 and the filter housing cover guide elements 37 are inserted into the guide rails 112, then the filter housing cover 15 can be displaced in connecting direction V until the guide rail 112 comes into contact with the filter housing cover latching lugs 35. The filter housing cover guide element 37 is resiliently deflected as a result of this contact, and so the filter housing cover guide elements 37 are deflected toward the filter housing cover 15, at least in the region behind the spacing brackets 39. "Behind" the spacing brackets 39 is considered to be the area of the filter housing cover guide elements 37 that lies opposite the side of the connector plug 17 in the attaching direction A.

If the filter housing cover 15 is pushed further in the connecting direction V, the outer surface 122 of the guide rail 112 slides along the inclined surface 43 of the filter housing cover latching lug 35. Once the filter housing cover latching lug 35 reaches the guide member latch recess 120, the filter housing cover guide elements 37 move back to their original position, and so each of the filter housing cover latching lugs 35 latches with a corresponding guide member latch recess 120. In particular, the latch surface 45 of the latching lug, which is in contact with the guide rail 112, prevents the filter housing cover 15 from being pulled out inadvertently.

To release the engagement or to support the engagement process, the filter housing cover guide elements 37 can each have an actuation surface 47. The filter housing cover guide elements 37 can be elongated in the attaching direction A in a direction counter to the direction in which the connector plug 17 projects. This elongated section can act as an actuation surface 47 for the user. Preferably, the actuation surface 47 projects beyond the guide rails 112 in the connected state.

As is shown in FIGS. 6b) and 6c), the actuation surface 47 is curved upward, and so the distance between the filter housing cover guide elements 37 tapers toward the connector plugs 17 in attaching direction A.

By pressing the filter housing cover guide elements 37 together, the user can resiliently deflect the filter housing cover guide elements 37. The engagement can be released in this way. The engagement can be reinforced when the filter housing cover guide elements 37 are pushed apart by the actuation surfaces 47.

The actuation surfaces 47 preferably taper in a curved shape. In so doing, the curved shape can be adapted to the natural shape of a human finger. Additionally, an actuation surface bulge 49 can be formed on the free end of the actuation surfaces 47. This can ensure that the user's fingers can rest securely on the actuation surfaces 47 and slipping can be prevented.

In a preferred embodiment, the guide rails 112 are formed with a filter housing cover enclosure 400.

The filter housing cover enclosure 400 connects to one of the two guide rails 112 and can additionally be used to attach the guide rails 112 to the filter housing cover retaining structure 300.

The filter housing cover enclosure 400 has an enclosure connecting element 402 for this purpose. Enclosure hoods 404 corresponding to the number of attachment elements are formed on the upper side of the enclosure connecting element 402 The enclosure hoods 404 are open toward the filter housing cover 15 in the attaching direction A and/or in the connecting direction V so that the connector plugs 17 can enter into said enclosure hoods 404. The connector sockets 19 of the filter housing retaining structure 300 are covered by the enclosure hoods 404. When the attachment elements are in the connected state, the enclosure hoods 404 cover the attachment elements.

Though represented as separate elements, the guide frame 100 and/or the filter housing cover enclosure 400 can be configured integrally with the filter housing retaining structure 300.

Figure 7A:
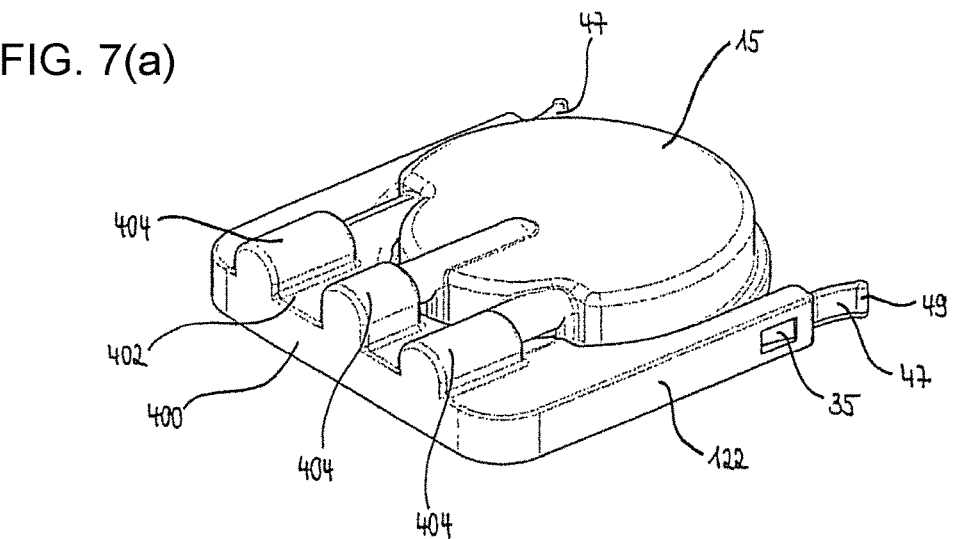
FIG. 7a)-b) show the filter housing cover according to FIG. 6 in a connected state and in a state before the filter housing cover is inserted into the guide members.

FIG. 7*a*) shows the filter housing cover 15 from FIG. 6 in the connected state of the attachment elements, which are covered by the filter housing cover enclosure 400.

Figure 7B:
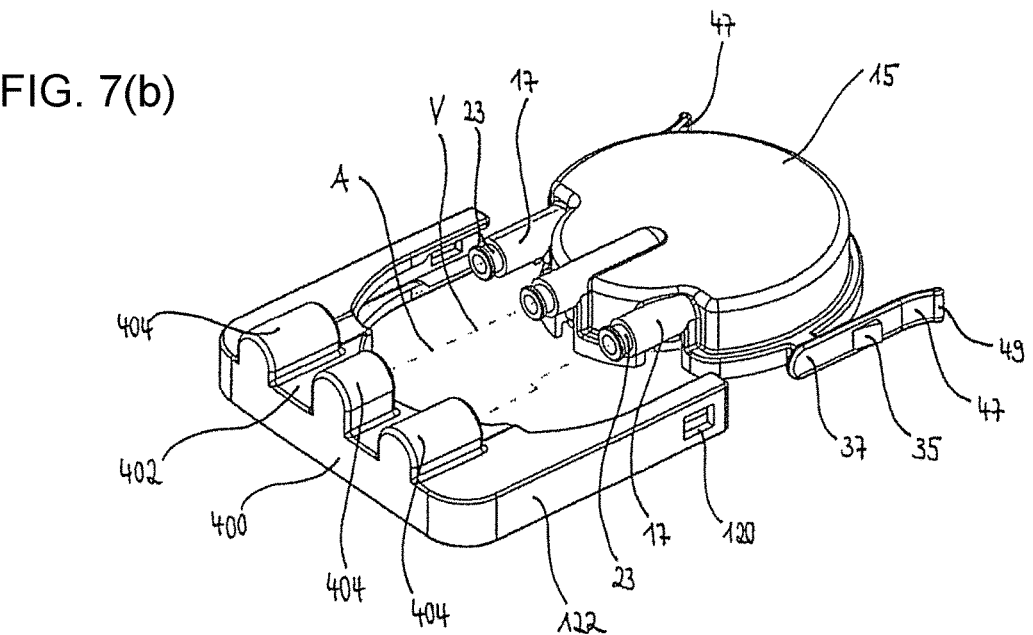

FIG. 7*b*) shows the filter housing cover enclosure 400 and the filter housing cover 15 according to FIG. 6 in the unconnected state.

The enclosure connecting element 402 can preferably be congruent in shape with the filter housing cover 15 so that, in the connected state, the surface of the filter housing cover 15 match the enclosure connecting element 402 with which it comes into contact.

Figure 8:
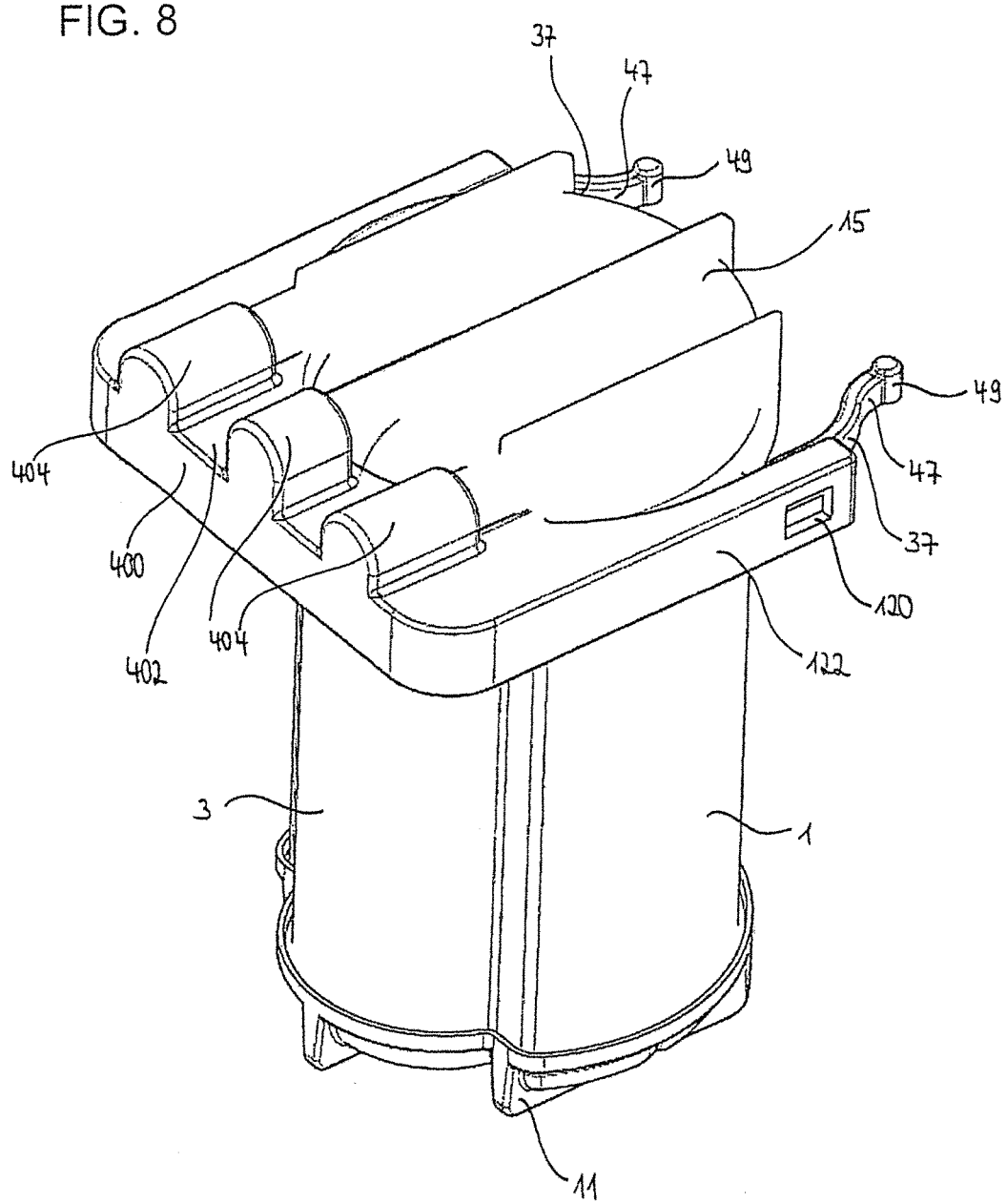
FIG. 8 shows an embodiment similar to the embodiment according to FIGS. 6 and 7, but with narrowing actuation surfaces.

FIG. 8 shows an embodiment that is similar to the embodiment in FIGS. 6 and 7 and that differs substantially in that the filter housing cover guide elements 37 taper away from the connector plugs 17 in the attaching direction A. In this way, it can be ensured that it is possible to actuate the actuation surfaces 47 with any hand size.

Figure 9:
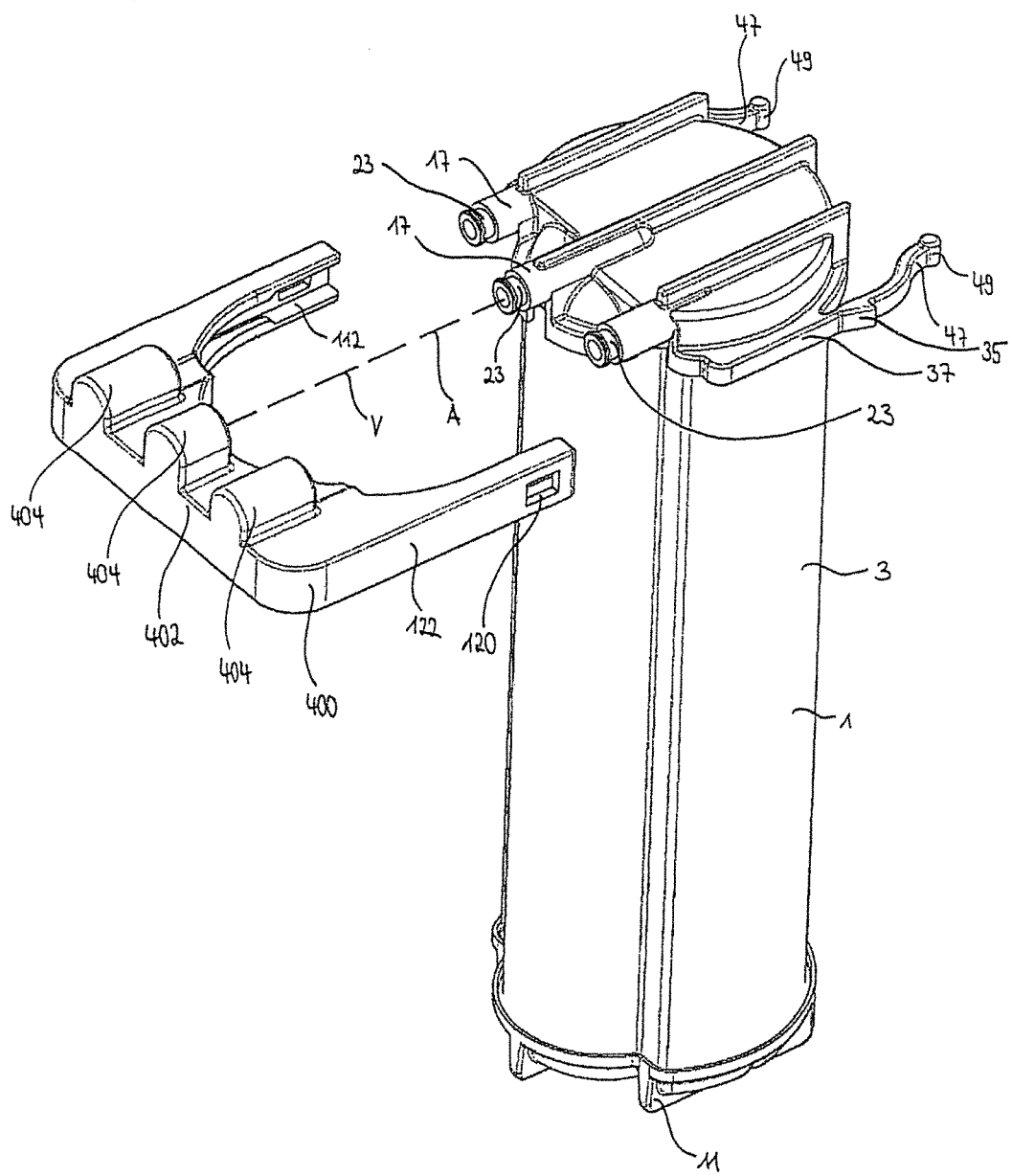
FIG. 9 shows a filter housing according to the embodiment in FIG. 8 before the filter housing cover is inserted into the guide members.

The filter housing cover guide elements 37 can be mounted resiliently on the filter housing cover 15 for this reason, as in the embodiment according to FIGS. 6 and 7. Alternatively, the filter housing cover guide elements 37 can be rigidly connected to the filter housing cover 15, as is shown in FIG. 9. Only the region of the filter housing cover guide elements 37, which tapers, is configured to be resilient. The filter housing cover latching lugs 35 and the actuation surfaces 47 are arranged in the tapering region. The rigid region of the filter housing cover guide elements 37 is the region that can be guided within a guide member or a guide rail 112. This region is preferably congruent in shape with the guide members and guide rails 112.

Although it is described in FIGS. 6 through 9 that the actuation surfaces 47 are all configured identically, the shapes of the actuation surfaces 47 can deviate from each other in their individual forms.

It should be noted that combinations of the latching members illustrated above are likewise possible.

Figure 10:
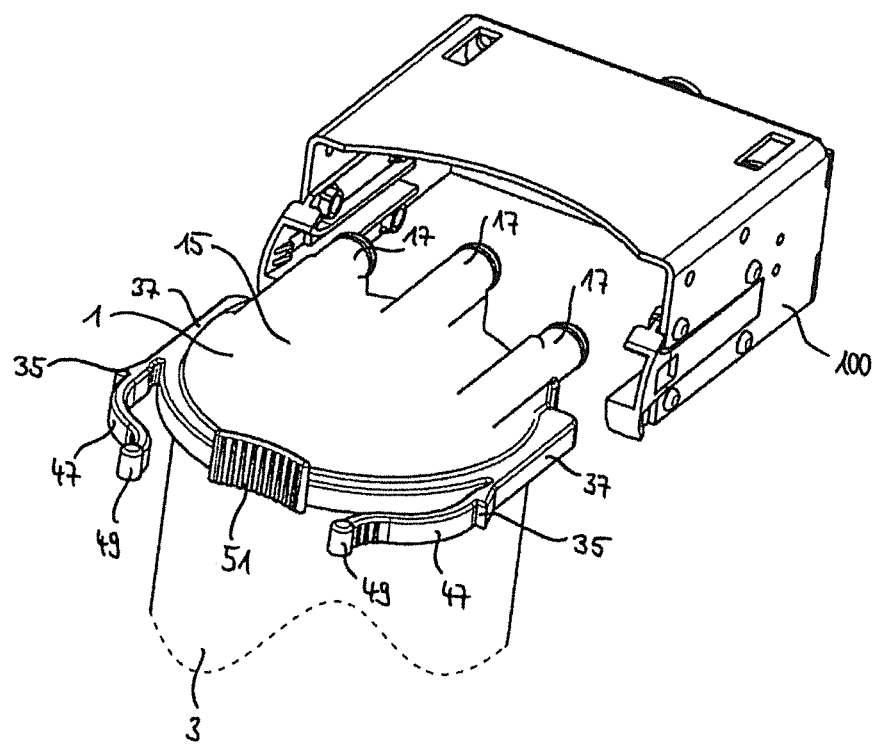
FIG. 10 shows a perspective view of a preferred filter housing cover and a preferred guide frame.

FIG. 10 shows a perspective view of a preferred guide frame 100 and a preferred filter housing cover 15. However, as is shown in FIG. 10 and similar to the filter housing cover 15 in FIGS. 8 and 9, the filter housing cover 15 differs in that at least one pressure transducer 51 is provided on a rear end of the filter housing cover 15, which is oriented opposite the end on which the connector plugs 17 are arranged. The pressure transducer 51 is designed as an actuation surface for at least one of the user's fingers, which can be placed on the pressure transducer 51 in order to displace the filter housing cover 15 within the guide frame 100 and to apply the pressure necessary to fully engage the connector plug 17 with the connector socket 19. Preferably, the pressure transducer 51 is curved to prevent the finger from shifting or sliding off. Moreover, the pressure transducer 51 can be provided with a grooved or roughened surface. This can likewise prevent the finger from sliding off.

Although the pressure transducer 51 in FIG. 10 is arranged on a filter housing cover 15 according to FIGS. 8 and 9, the pressure transducer 51 also be arranged on any other filter housing cover 15 of the other embodiments described.

The preferred embodiment of the guide frame 100 in FIG. 10 is described in greater detail with reference to FIG. 11.

Figure 11:
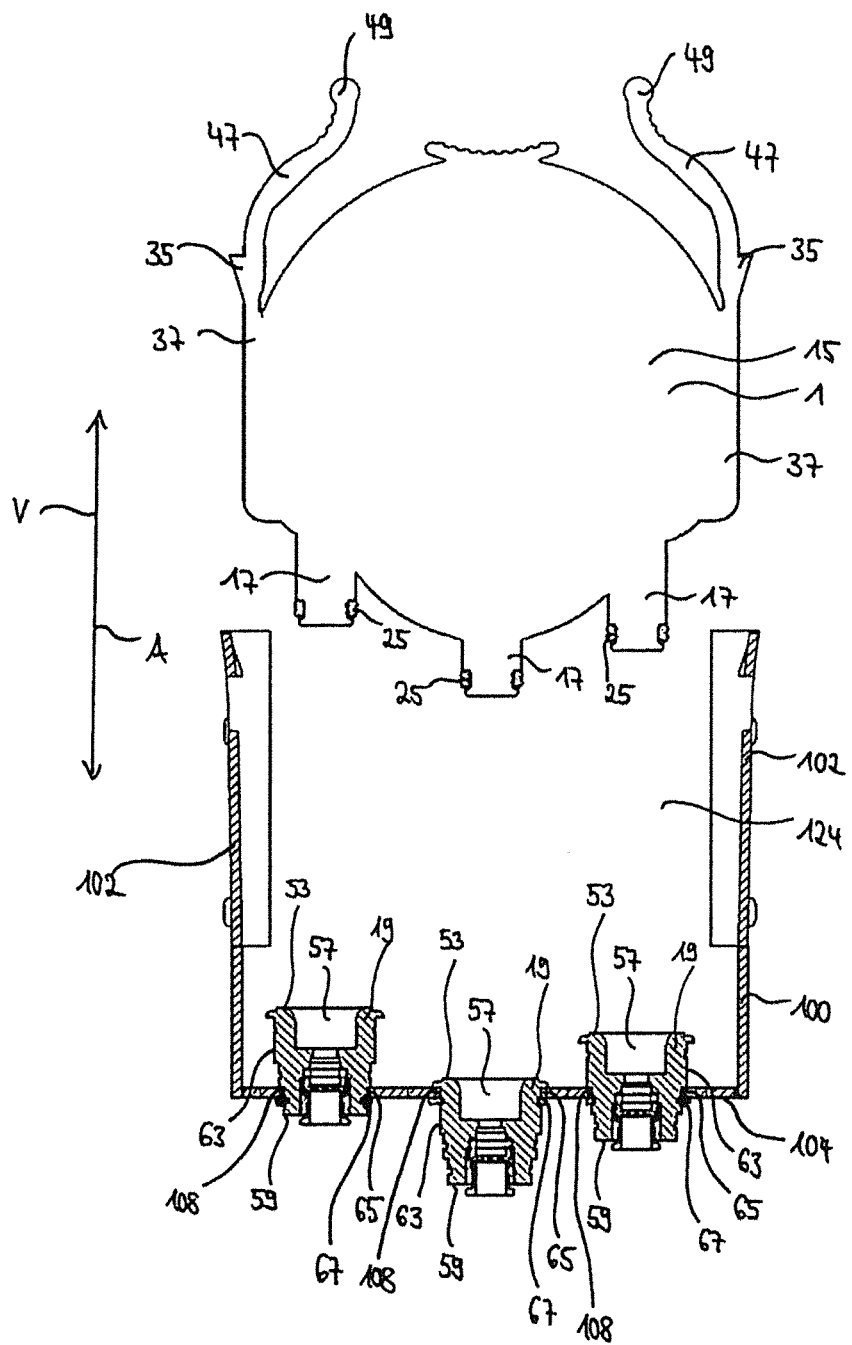
FIG. 11 shows a sectional view through the guide frame and the filter housing cover according to FIG. 10, which are sectioned along the connecting direction V.

FIG. 11 shows a sectional view through the filter housing cover 15 and the preferred guide frame 100 according to FIG. 10, which are sectioned along the connecting direction V.

One connector socket 19 can be formed in each of the attachment element recesses 108 that are formed in the retaining plate 104 of the guide frame 100. A front end 53 of the connector socket 19 projects into an interior space 124 of the guide frame 100, which is formed between the opposing sides 102 of the guide frame. The connector plugs 17 can protrude to different depths in the interior space 124 depending upon the arrangement of the connector plugs 17 on the filter housing cover 15.

A connector socket receiving space 57 is formed at the front end 53 of the connector socket 19, in which the connector plugs 17 can each be at least partly accommodated. The size and/or shape of the connector socket receiving space 57 is/are adapted to the shape and/or size of the connector plug 17 in such a way that a fluid-tight connection can be established between the connector plug 17 and the connector socket 19. This can be ensured by the abovementioned sealing rings 25, which are provided on the connector plugs 17, for example. Alternatively, at least one sealing ring 25 can be provided in the connector socket receiving space 57.

Furthermore, a rear end 59 of the connector socket 19, which is opposite the front end 53 of the connector socket 19, can protrude out of the guide frame 100. When the guide frame 100 is connected to a filter housing retaining structure 300 (not shown here), the rear end 53 of the connector socket 19 preferably projects into an interior space of the housing of the filter housing retaining structure (not shown here) in order to be connected there to the collection tank for the fluid, e.g. by means of hoses. To permit a transfer of fluid through the connector socket 19 for this purpose, at least one fluid duct 61 extends from the connector socket receiving space 57 to the rear end 59 of the connector socket 19.

At least one circumferential step 65 and/or notch is formed in a lateral surface 63 of the connector socket 19, which extends around the connecting direction V or the attaching direction A. A circumferential step 65 is preferably configured such that the connector socket 19 tapers at this point from the front end 53 to the rear end 59. The tapering section of the connector socket 19 can then protrude through the attachment element recess 108 of the guide frame 100, while the wider section of the connector socket 19 is wider or larger than the connector socket recess 108, so that the connector socket 19 rests upon the guide frame retaining plate 104 in a preferably form-fitting way with the aid of the step 65. If it is a notch, the circumferential edge of the attachment element recess 108 projects into the notch. In this way, a fixed arrangement of the connector socket 108 on the guide frame 100 is likewise achieved.

Figure 12:
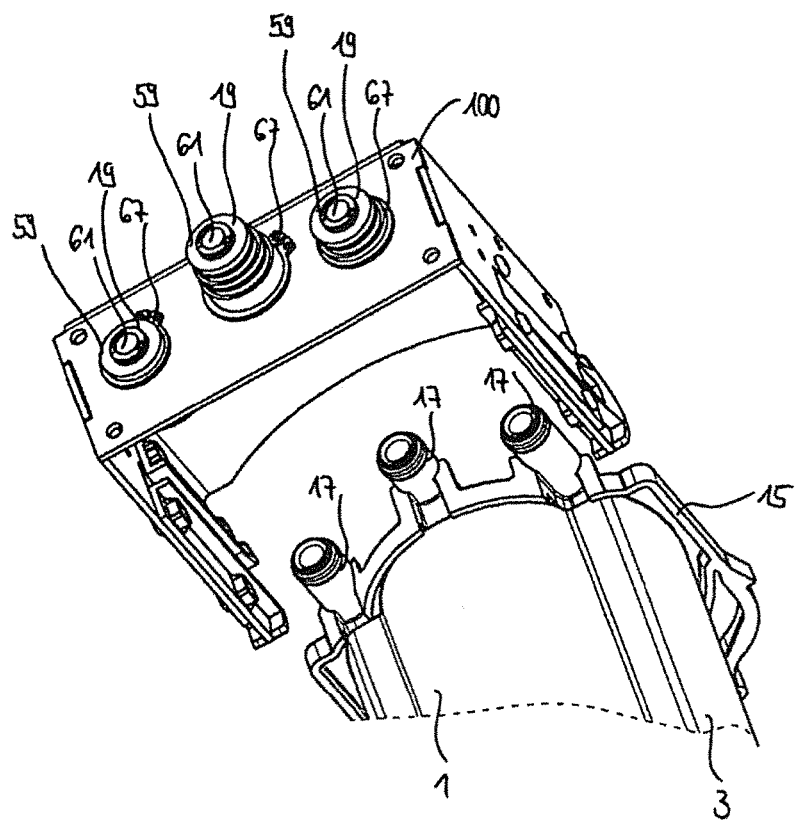
FIG. 12 shows a perspective view of the guide frame and the filter housing cover according to FIGS. 10 and 11 from the rear side.

If the connector socket 19 has a step 65, then the connector socket 19 can be secured against slipping in the connecting direction V or attaching direction A (X direction) with the aid of at least one securing ring 67, as is shown in FIG. 12.

Preferably, the size of each connector socket 19 and attachment element recess 108 is dimensioned such that the connector socket 19 has 0.5 mm to 1 mm of play in the Y-Z plane within the attachment element recesses 19, i.e. they are moveably mounted in accordance with the play in the Y axis and/or Z axis (the X axis corresponds to connecting direction V). The outer connector sockets 19 preferably have less play than the middle connector socket(s) 19. For example, the outer connector sockets 19 have 0.5 mm of play, whereas the middle connector socket(s) have 1 mm of play. Connecting the connector sockets 19 to the connector plugs 17 can be facilitated by the additional play, and so connecting the filter housing retaining structure 1 to the filter housing retaining structure 300 is improved for the user.

Although connector sockets 19 of the type in FIGS. 10 through 12 are connected to the guide frame 100, the connector sockets 19 can also be inserted into corresponding recesses in the housing 302 of the filter housing retaining structure 300 if, for instance, the guide frame 100 does not have a guide frame retaining plate 104. Moreover, connector sockets 19 such as these can be employed in any of the previously described embodiments.

In addition, each of the engagements illustrated above can contain an electric/electronic intelligence that detects the connection with the cartridge cover 15. In this case, electric closers/openers, relays or electronic sensors such as NFC ("near field communication") or RFID ("radio-frequency identification") are possible. It is also conceivable that the position and type of the cleaning cartridge inserted can be recognized by means of a barcode.

LIST OF REFERENCE SIGNS

1 Filter housing
3 Base body
9 First free end of the base body
11 Filter housing base
13 Second free end of the base body
15 Filter housing cover
17 Connector plug
19 Connector socket
21 Outer side of the connector plug
23 Notch
25 Sealing element
27 Inner side of the connector socket
29 Filter housing cover guide member
31 Pin
33 Depression
35 Filter housing cover latching lug
37 Filter housing cover guide element
39 Spacing bracket
41 First end of the filter housing cover guide element
43 Inclined surface of the filter housing cover latching lug
45 Latching lug latch surface
47 Actuation surface
49 Actuation surface bulge
51 Pressure transducer
53 Front end of the connector socket
57 Connector socket receiving space
59 Rear end of the connector socket
61 Fluid duct
63 Lateral surface of the connector socket
65 Step
67 Securing ring
100 Guide frame
102 Guide frame side
104 Guide frame retaining plate
106 First free end of the guide frame side
108 Attachment element recess
110 Opposite lateral surface of the guide frame sides
112 Guide rail
114 Second free end of the guide frame side
116 Latching clamp
118 Latching hook
120 Guide member latch recess
122 Outer surface of the guide rail
124 Interior space of the guide frame
200 Snap fastener
202 Clasp
204 Catch
206 Catch retaining plate
300 Filter housing retaining structure
302 Housing for the filter housing retaining structure
400 Filter housing cover enclosure
402 Enclosure connecting element
404 Enclosure hood
A Attaching direction
SR Rotary axis of the catch
V Connecting direction

The invention claimed is:

1. A connecting structure for connecting a filter housing (1) to a filter housing retaining structure (300), two opposed guide members being arranged on the filter housing retaining structure (300), each of the guide members having a latching recess (120) formed therein, said connecting structure being configured to conduct a liquid that is to be cleaned to the filter housing (1) and to discharge the liquid that has been cleaned, the connecting structure comprising:

a filter housing cover (15) that can be connected to the filter housing (1), the filter housing cover (15) comprising:

at least two filter housing cover attachment elements (17) that can be connected to corresponding filter housing retaining structure attachment elements (19) in the filter housing retaining structure (300) in order to establish an exchange of fluids between the filter housing retaining structure (300) and the filter housing (1);

at least two filter housing cover guide (29) on substantially opposing sides of the filter housing cover (15), lugs (35) disposed respectively on the filter housing cover guides (29), each of the lugs (35) having an inclined surface disposed and oriented to contact the respective guide members of the filter housing retaining structure (300) so that the filter housing cover guides (29) deflect toward one another as the filter housing cover (15) is moved toward the filter housing retaining structure attachment elements (19), each of the lugs

(35) further having a latch surface (45) facing oppositely from an attaching direction (A) of the filter housing cover attachment elements (17) to the filter housing retaining structure attachment elements (19) and configured to engage in the latching recesses (120) when the filter housing cover attachment elements (17) connect to the corresponding filter housing retaining structure attachment elements (19), and an actuation surface (47) spaced from the lugs (35) in a direction opposite the attaching direction (A) and configured to receive manual forces for deflecting the filter housing cover guides (29) toward one another for releasing the lugs (35) from the latching recesses (120).

2. The connecting structure of claim 1, wherein the at least two filter housing cover guide (29) protrude from the two opposite sides of the filter housing cover (15) in a direction substantially perpendicular to the attaching direction (A) of the filter housing cover attachment elements (17).

3. The connecting structure of claim 1, wherein the guide members have guide rails (112) that lie opposite each other and are configured linearly to correspond to the attaching direction (A).

4. The connecting structure of claim 1, wherein the guide (29) of the filter housing cover are mounted resiliently and the actuation surfaces (47) that extend in the direction opposite the attaching direction (A) of the filter housing cover attachment elements (17) are curved to define outwardly concave finger pressing surfaces.

5. The connecting structure of claim 4, wherein the actuation surfaces (47) are configured such that they widen or taper in the attaching direction (A).

6. The connecting structure of claim 1, wherein the lugs (35) project from the filter housing cover guide (29) in a direction perpendicular to the attaching direction (A).

7. The connecting structure of claim 1, further comprising at least one pressure transducer disposed on a rear end of the filter housing cover (15) and configured to be pushed by the user in order to connect the filter housing cover (15) to the filter housing retaining structure (300).

8. A cleaning system comprising the connecting structure of claim 1 and a filter housing retaining structure (300), with which the filter housing cover (15) can be connected.

9. The cleaning system of claim 8, wherein the guide members are connected by a retaining plate (104) and said plate is arranged on a housing (302) of the filter housing retaining structure (300), and
wherein each of the attachment elements (19) of the filter housing retaining structure is inserted into a recess (108) in the retaining plate (104) and protrudes through the retaining plate 104 so that each of the attachment elements (19) can be connected to the attachment elements (17) of the filter housing cover.

10. The cleaning system of claim 9, wherein the attachment element (19) of the filter housing retaining structure is mounted in the recess (108) such that displacement in the attaching direction (A) is blocked.

11. A filter housing cover (15) for a filter housing (1) that can be connected to a filter housing retaining structure (300), said filter housing retaining structure (300) being designed to conduct a liquid that is to be cleaned to the filter housing (1) and to discharge the liquid that has been cleaned,
wherein the filter housing cover (15) is configured to be connected to the filter housing (1);
wherein the filter housing cover (15) has at least two filter housing cover attachment elements (17) that can be connected to corresponding attachment elements (19) of the filter housing retaining structure (300) in order to establish an exchange of fluid between the filter housing retaining structure (300) and the filter housing (1);
wherein the filter housing cover (15) has at least two filter housing cover guide (29) on opposite sides of the filter housing cover (15) and configured to engage in guide members that can be attached to the filter housing retaining structure (300) while connecting the attachment elements (17) of the filter housing cover with the attachment elements (19) of the filter housing retaining structure to support and guide the filter housing cover during connection and to mount the filter housing cover such that the filter housing cover can be displaced in a linear connecting direction (V); and
each of the filter housing cover guides (29) having a lug (35), each of the lugs (35) having an inclined surface disposed and oriented to contact the respective guide members of the filter housing retaining structure (300) so that the filter housing cover guides (29) deflect toward one another as the filter housing cover (15) is moved toward the filter housing retaining structure attachment elements (19), each of the lugs (35) further having a latch surface (45) facing oppositely from an attaching direction (A) of the filter housing cover attachment elements (17) to the filter housing retaining structure attachment elements (19) and configured so that the latch surfaces (45) engage respectively in latching recesses (120) of the guide members when the filter housing cover attachment elements (17) connect to the corresponding filter housing retaining structure attachment elements (19), and each of the filter housing cover guides (29) further having an actuation surface (47) spaced from the lugs (35) in a direction opposite the attaching direction (A) and configured to receive manual forces for deflecting the filter housing cover guides (29) toward one another for releasing the lugs (35) from the latching recesses (120).

12. A method for connecting a filter housing cover (15) to a filter housing retaining structure (300), wherein the method comprises:
providing cleaning system of claim 8;
inserting the filter housing cover guide (29) into the guide members such that the filter housing cover guide (29) are supported within the guide members;
displacing the filter housing cover (15) linearly in the attaching direction (A) until the attachment elements (17) of the filter housing cover (15) are connected to the attachment elements (19) of the filter housing retaining structure (300).

13. The method of claim 12, further comprising:
latching the filter housing cover (15) or the filter housing (1) to the filter housing retaining structure (300) by at least one latch.

14. The connecting structure of claim 4 wherein ends of the filter housing cover guides (29) adjacent the actuation surfaces (47) include actuation surface bulges (49) to prevent slippage of a finger from the respective actuation surface (47) when separating the filter housing cover (15) from the filter housing retaining structure (300).

* * * * *